J. VAN GEEM.
BEER MEASURING DEVICE.
APPLICATION FILED JAN. 29, 1913.
1,210,567.
Patented Jan. 2, 1917.
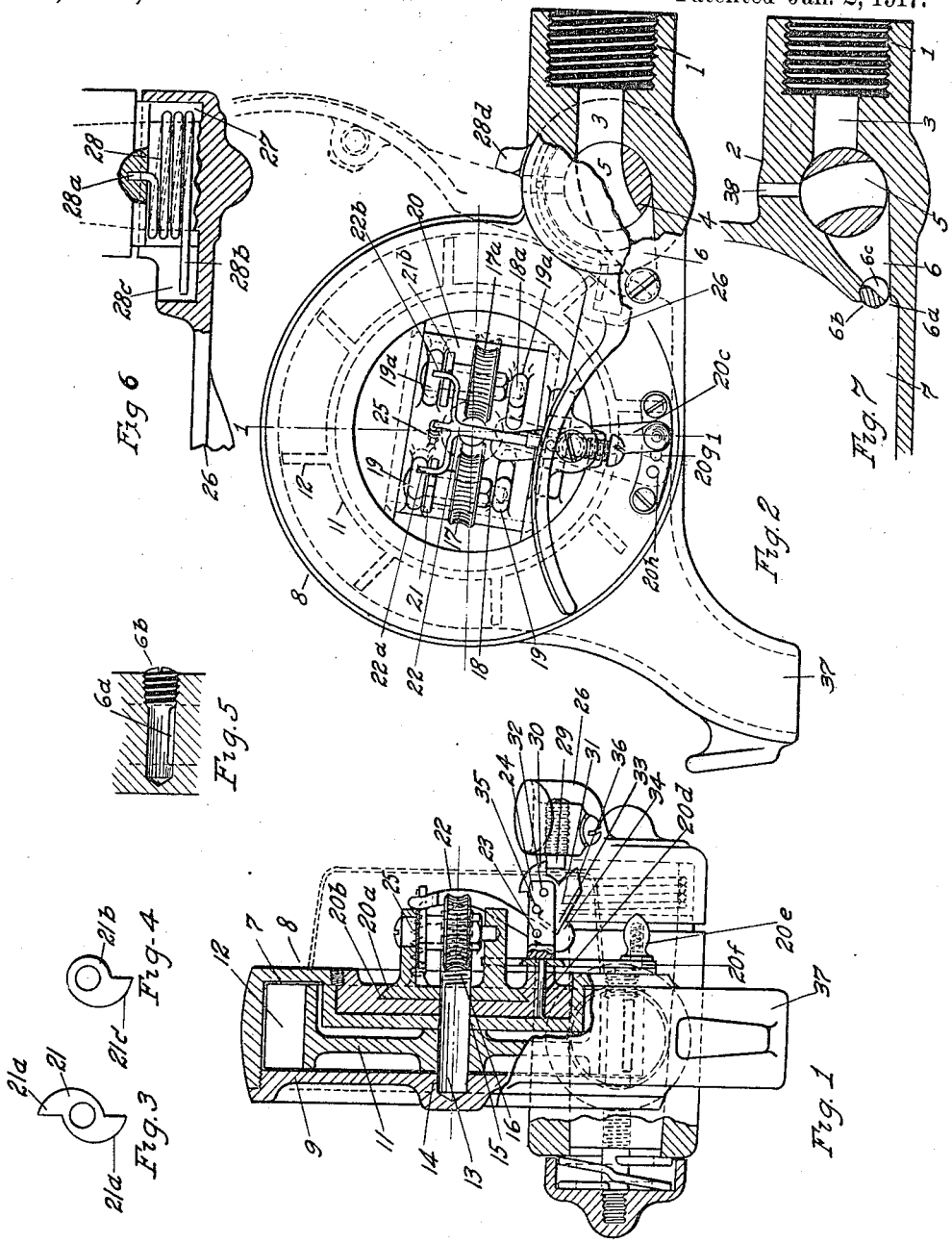
Witnesses
B. M. Hartman
M. G. Hornaman
Inventor
John Van Geem
by H. Z. Lunf
Attorney

UNITED STATES PATENT OFFICE.

JOHN VAN GEEM, OF ERIE, PENNSYLVANIA.

BEER-MEASURING DEVICE.

1,210,567.   Specification of Letters Patent.   Patented Jan. 2, 1917.

Application filed January 29, 1913. Serial No. 744,869.

*To all whom it may concern:*

Be it known that I, JOHN VAN GEEM, a citizen of the United States, residing at Erie, in the county of Erie and State of Pennsylvania, have invented new and useful Improvements in Beer-Measuring Devices, of which the following is a specification.

This invention relates to beer measuring devices and consists in certain improvements in the construction thereof as will be hereinafter fully described and pointed out in the claims.

The device is particularly designed for measuring beer or liquids of similar character. The correct measuring of such liquids is made very necessary by the dispensing laws of many States which restrict the amount of such liquids that retailers can sell so that the sale of a greater amount than this by a retailer is an offense. The expansion of the gases in the liquid, if it is agitated varies its volume so greatly as to make the measuring very difficult by the use of ordinary measuring utensils. A measuring device which agitates the liquid during the measuring operation is unreliable because of the unequal expansion of these gases and the consequent varying volumes of the liquid. Another difficulty in dispensing beer or like beverages heretofore encountered has been the retention in the device of a small amount of the beverage after the closing of the dispensing passage and inasmuch as a considerable interval may elapse between the dispensing operations such residues become stale and objectionable.

Among the objects of the invention are to provide such a measuring device acting without such agitation of the beer as to vary the measured volume and to form such a device in a manner to prevent the retention of the liquid in such a manner as to become stale.

Other objects of the invention will appear from the specification and claims.

The invention is illustrated in the accompanying drawings as follows:—

Figure 1 is a partial section on the line 1—1 in Fig. 2. Fig. 2 a side elevation of the device, partly in section. Fig. 3 a side elevation of the latch actuating cam for pints. Fig. 4 a side elevation of the latch actuating cam for quarts. Fig. 5 a section showing the nozzle adjusting device. Fig. 6 a sectional view showing the handle operating spring. Fig. 7 a sectional view through the controlling valve.

1 marks the inlet. This is ordinarily screw threaded so as to be readily secured to the pipe leading to the cask or other dispensing receptacle. This is in the form of an extension on the valve body 2, the valve body having the way 3 leading to the inlet. The valve plug 4 has a way 5 adapted to be brought into and out of register with the way 3, the discharge way 6 leading from the way 5 is slightly tapered and leads to a nozzle 6ª. The nozzle is adjusted by the valve 6ᵇ with a way 6ᶜ at one side. The nozzle directs the flow to a measuring wheel cavity 7. This cavity is formed in a body 8 extending from the valve body 2 and is inclosed by a cap 9 which is screwed into the body 8, the cap being provided with a shoulder which is brought into contact with the edge of the body 8. The measuring wheel 11 has the impeller blades 12 which are in the path of the liquid as it comes from the nozzle 6ª. The wheel is fixed on the shaft 13 and this shaft is carried in the bearings 14 and 15 in the cap 9 and body respectively. The shaft 13 terminates in a worm 16 which is outside the body 8 and this worm is adapted to be thrown into mesh with the worm gears 17 and 17ª. The worm gears 17 and 17ª are carried by the shafts 18 and 18ª respectively and the shafts 18 and 18ª are journaled in the ears 19 and 19ª respectively. The ears 19 and 19ª are carried by a sliding plate 20. The sliding plate 20 has the dove tail 20ª on its inner face which is adapted to operate in a dove tailed groove 20ᵇ in the face of the body 8. The lever 20ᶜ is journaled on the pin 20ᵈ extending into the body 8. The upper end of this lever operates between two of the ears 19 and 19ª so that the movement of the lever is communicated to the plate 20. This lever is made of spring metal and is provided at its lower end with a handle 20ᵉ and projecting from the inner side of the lever is a pin 20ᶠ which snaps into the openings 20ᵍ in the plate 20ʰ. As shown in Fig. 2 the gear 17ª is in mesh with the worm 16. By taking hold of the handle 20ᵉ, the pin 20ᶠ may be pulled out of the opening 20ᵍ and the lever 20ᶜ swung to the middle or neutral opening (see Fig. 2). In this position on the plate both the worm gears 17 and 17ª will be thrown out of mesh with the worm 16 and the faucet may be used with the parts in this position as an ordinary faucet. By throwing the catch 20ᶠ to the opening 20ᵍ at the left of Fig. 2 the worm gear 17 may be thrown into mesh with the worm. A cam 21 is fixed on the shaft 18. It will be noted that this has two cam surfaces 21ᵃ—21ᵃ so that with each rotation of the shaft two cams 21ᵃ are brought into working position. A cam 21ᵇ is fixed on the shaft 18ᵃ. It has but one cam surface 21ᶜ so that with each rotation of the shaft 18ᵃ but one working surface or cam is brought into working position.

A latch 22 is provided with the arms 22ᵃ and 22ᵇ which are adapted to operate on the cams 21 and 21ᵇ respectively. The latch 22 is pivoted on a pin 23 in a post 24 extending from the frame 8. The latch is held in contact with the cams by a spring 25.

A handle 26 is fixed on the end of the valve plug 4. The end of the handle is provided with a cavity 27 in which the coil spring 28 is arranged, the one end 28ᵃ being fixed in the valve body and the opposite end 28ᵇ extending into the slot 28ᶜ in the handle. This spring is initially under tension so that when the handle is released it turns the valve plug so as to close the valve. A stop 28ᵈ is provided for limiting the movement of the valve under the influence of the spring 28. An adjustable catch in the form of a screw 29 is arranged to engage the shoulder 30 in a trip lever 31. The trip lever 31 is pivoted on a pin 32 at the end of the post 24. It has a catch surface 33 which operates on the surface 34 on the end of the latch 22. A stop 35 is arranged on the post 24 and limits the swinging of the latch when released. The latch 22 is actuated by the cams 21 and 21ᵇ so as to throw the surface 34 out of engagement with the surface 33. This releases the latch and permits the handle to swing to the dotted position shown in Fig. 2, thus closing the valve. After the handle is tripped, the trip lever 31 assumes a position by gravity carrying the shoulder 30 out of the path of the screw 29 and brings the surface 36 into the path of the screw 29 and the stop or screw 29 operating on the surface 36 as cam forces the latch against the end of the lever 22, thus lifting the lever 22 against the tension of the spring 25 and swinging the working surface 33 into position to be engaged by the surface 34. As the handle 26 is released by the operator, said handle engages the shoulder 30, thus locking the valve 4 open until the desired quantity has been run out.

By throwing the slide 20 so as to bring the worm gear 17 into engagement with the worm, the cam 21 is made to operate and the lever 22 is tripped by the cam 21 on a half revolution of the shaft 18. In this way pints may be measured. By sliding the plate 20 so as to bring the worm gear 17ᵃ into mesh with the worm, the shaft 18ᵃ may be made to operate and thus operating the cam 21ᵇ actuates the trip lever only once in a revolution and this is designed to measure quarts. By sliding the plate to the central position neither trip is used and by holding down the handle 26 or above the trip lever liquid may be drawn through the valve in the usual manner without measuring. It will be noted that by using the slide and double worm construction the device may be made to measure pints and then quarts or alternatively either of these and the cams 21 and 21ᵇ are always in position to start a revolution in position to properly measure the amounts designed.

In the operation of the device, the trip surface 34 must be so proportioned with relation to the surface 33 that the tripping action takes place just as the point of the cam reaches the trip lever so that the momentum of the wheel will carry the point of the cam past the trip lever allowing the trip lever to drop to engaging position. By interposing the trip lever between the handle and the latch, the pressure on the latch may be very much lessened so that the resistance to the movement of the measuring wheel may be as slight as possible. Where very light pressures are used in the dispensing apparatus this is essential to the success of the device.

The handle normally occupies the position shown in dotted lines in Fig. 2 with the valve closed. When it is desired to dispense some liquid, the handle is forced downwardly to the position shown in solid lines in Figs. 1 and 2, the catch 29 engaging the shoulder 30. The liquid first flows through the ways 3, 5 and 6 into the wheel cavity 7 against the impelling blades and thence to the discharge nozzle 37. The wheel 11 is rotated through the impact of the liquid upon it until the shaft 18 has made one half a revolution, or the shaft 18ᵃ a full revolution when through the action of the cam upon the latch 22 the rear end of the latch is lifted outwardly and the operative end of the latch 22 depressed out of the path of the surface 33. This releases the trip lever and thus the handle 26 and the valve is closed through the action of the spring 28.

It will be noted that the liquid passing through the ways through the device is carried by ways free from any abrupt changes of direction so that the agitation of the liquid is very slight and consequently the liquid maintains a uniform volume as it is discharged past the wheel. It will also be observed that the measuring device is drained of liquid with each operation. In other words, the bottom of the operating cavity from the valve to the discharge nozzle is so arranged as to drain itself. I prefer in addition to such arrangement of the discharge passages to arrange the valve so as to drain the way in the valve and to this end the discharge way 6 extends horizontally or downwardly from the bottom of the plug cavity and connects the passage 6 with the way 5 when the valve is closed. A vent passage 38 is provided so that this way will readily drain with the closing of the valve. From this it will be observed that all the liquid is dispensed that is released from the dispensing pressure. There is no residue of liquid retained which may become stale or objectionable.

What I claim as new is:—

1. In a beer measuring device, the combination of a valve body having a valve passage, a plug valve having a way therethrough; a wheel driven by the liquid coming from the valve; and a body for the wheel having a passage connecting with the valve passage, the passages in the wheel body and valve body being arranged to drain to the discharge and the way in the valve connecting with said passages when the valve is closed.

2. In a beer measuring device, the combination of a valve; a wheel driven by the beer coming from the valve; a valve body in which the wheel is mounted; a worm driven by the wheel; a worm gear actuated by the worm; a cam rotating with the worm gear; a latch actuated by the cam; a handle for the valve; a catch on the handle operating in connection with the latch to lock the valve open; and a spring for closing the valve, said latch being operated by the cam to release the handle with a predetermined movement of the wheel.

3. In a beer measuring device, the combination of a valve body having a valve passage; a plug valve having a way therethrough; a wheel driven by the liquid passing the valve; and a body for the wheel having a passage connecting with the valve passage, the passages leading from the valve being arranged to drain to the discharge, and the way in the valve connecting said discharge passage when the valve is closed.

4. In a beer measuring device, the combination of a plug valve having a way therethrough; a body for the valve having a discharge passage draining from the valve and connecting with the way in the valve when the valve is closed; a wheel driven by the liquid passing the valve; and automatic means for closing the valve controlled by the wheel.

5. In a beer measuring device, the combination of a plug valve having a way therethrough; a body for the valve having a discharge passage draining from the valve and connecting with the way in the valve when the valve is closed; a wheel driven by the liquid passing the valve; and automatic means for closing the valve controlled by the wheel, said valve body having a vent connecting with the valve way with the valve closed.

6. In a beer measuring device, the combination of a valve having ways and passages therethrough terminating in a nozzle; a wheel driven by the beer coming through the valve and in position to receive the impact and to be driven by said liquid; means for automatically closing the valve with a given movement of the wheel; and devices for adjusting the nozzle to vary the action of the liquid on the wheel.

7. In a beer measuring device, the combination of a wheel; a valve; means for automatically actuating the valve; a trip device; a slide; two gears mounted on the slide; means on the wheel adapted to be thrown into mesh with either gear on the slide; and trip cams actuated by said gears, said cams being arranged to be actuated by a different number of turns of the wheel to effect the tripping action.

8. In a beer measuring device, the combination of a measuring wheel; a shaft on which it is mounted; a worm on said shaft; two worm gears adapted to be thrown into mesh with said worm; a plate on which said gears are mounted; means for locking the plate in neutral position and in mesh with each of said gears; a valve controlling the flow of beer; means for automatically closing the valve; and a tripping mechanism actuated by either of said gears, said tripping mechanism in connection with said gears being adapted to vary the volume.

9. In a beer measuring device, the combination of a valve controlling the flow; means for automatically closing the valve; a tripping device; a wheel actuated by the beer; a connection between the wheel and the tripping device: means for varying the connection to vary the volume necessary to effect the tripping action, said means having a neutral position for throwing the tripping mechanism out of action.

In testimony whereof I have hereunto set my hand in the presence of two subscribing witnesses.

JOHN VAN GEEM.

Witnesses:
C. D. HIGBY,
T. R. LEX.

Copies of this patent may be obtained for five cents each, by addressing the "Commissioner of Patents, Washington, D. C."